Sept. 25, 1928.  
J. L. SHROYER  
1,685,647  
METHOD AND MEANS FOR REGULATING TEMPERATURE  
Filed July 2, 1924  2 Sheets-Sheet 1

Inventor:  
Jacob L. Shroyer;  
by *[signature]*  
His Attorney.

Sept. 25, 1928.  J. L. SHROYER  1,685,647
METHOD AND MEANS FOR REGULATING TEMPERATURE
Filed July 2, 1924  2 Sheets-Sheet 2

Inventor:
Jacob L. Shroyer;
by  His Attorney.

Patented Sept. 25, 1928.

1,685,647

UNITED STATES PATENT OFFICE.

JACOB L. SHROYER, OF OAK PARK, ILLINOIS, ASSIGNOR TO EDISON ELECTRIC APPLIANCE COMPANY, INC., OF CHICAGO, ILLINOIS, A CORPORATION OF NEW YORK.

METHOD AND MEANS FOR REGULATING TEMPERATURE.

Application filed July 2, 1924. Serial No. 723,837.

My invention relates to a method and means for regulating the temperature of ovens, more particularly to a method and means for regulating the temperature of multiple compartment ovens, and has for its object the provision of means for controlling the heaters in the various compartments of the oven so as to maintain a substantially uniform temperature.

In carrying out my invention I provide a temperature responsive control device in each compartment of the oven and arrange the control devices in such manner that heaters radiating heat into adjacent compartments are controlled jointly by the temperature responsive control devices in such compartments. I also provide manually operable means for controlling the heaters.

Figure 1:
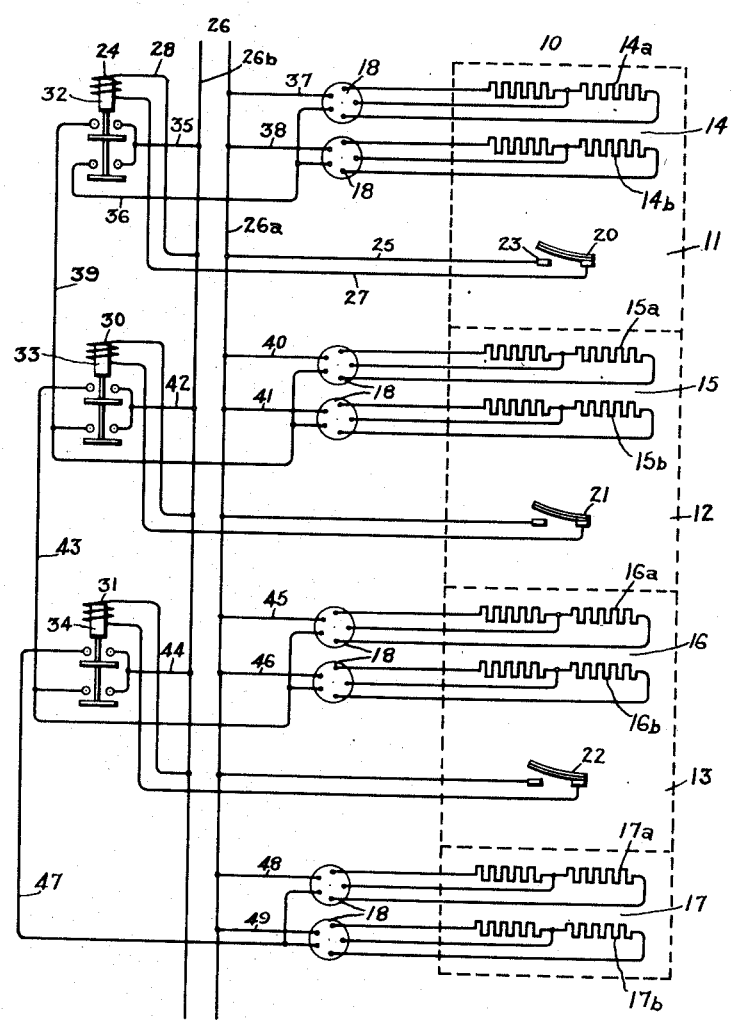
Figure 2:
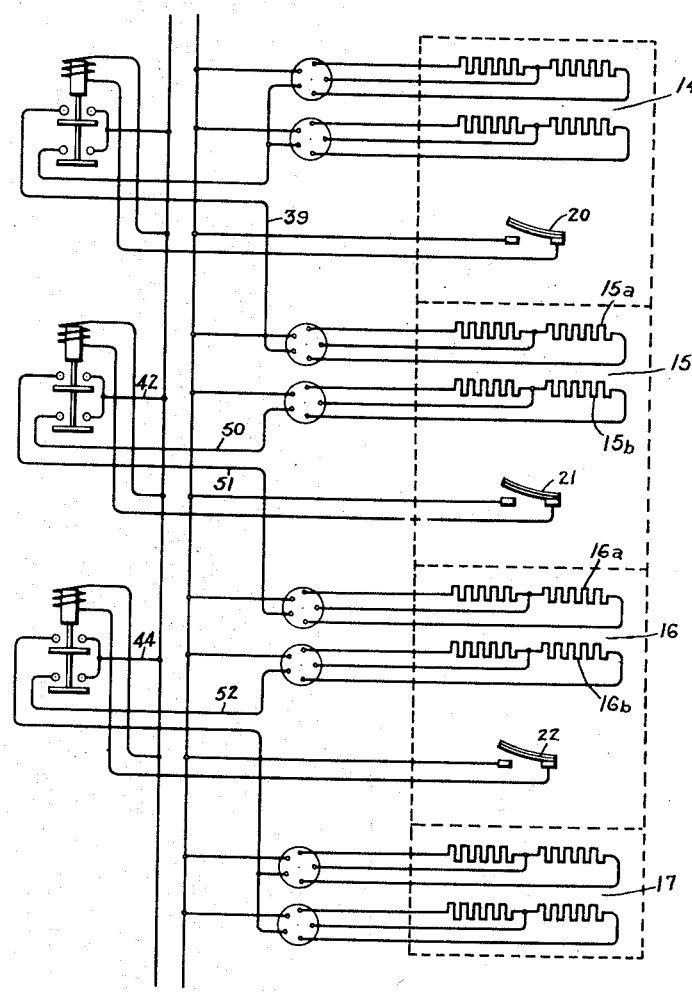

For a more complete understanding of my invention reference should be made to the accompanying drawings in which Fig. 1 shows in diagrammatic form a temperature regulator embodying my invention, while Fig. 2 shows in diagrammatic form a modification of my invention.

Referring to Fig. 1 of the drawing, I have shown my invention in one form as applied to a multiple compartment oven 10 indicated by dotted lines, the various compartments 11, 12 and 13 being arranged one above the other. Such an oven is described and claimed, for example, in Patent No. 1,203,909 to Ruckle. The oven is shown as being heated electrically although any suitable heating means may be used. Electric heating units 14, 15 and 16 are provided in the tops of the compartments 11, 12 and 13 respectively, and a heating unit 17 is provided in the bottom of the lower compartment 13. The heating units may gradually increase in output from top to bottom. It will be understood that in an oven of this type the various compartments may communicate with each other, that is, they may not be separated by heat insulated walls, but only by the grids for supporting the food, so that heating unit 15 radiates heat upward into compartment 11 as well as downward into compartment 12, and the heating unit 16 radiates heat upward into compartment 12 as well as downward into compartment 13. The end heating units 14 and 17 radiate heat in downward and upward directions respectively. In one aspect, therefore, the oven may be regarded as being provided with a heating unit at each end and with intermediate heating units radiating into adjacent compartments. It will also be understood that a solid tile deck may be provided between each pair of compartments, i. e., a deck made of material similar to fire brick which conducts heat freely and re-radiates into the adjoining compartment.

To provide for increased flexibility of control each of the heating units 14 to 17 inclusive is divided into two sections, and a three-heat snap switch 18 of any suitable well known form is included in the supply circuit for each section. Each section is in turn divided into two parts which may be connected in series relation, or in parallel relation by means of the snap switch 18 to give respectively low, and high heats, or only one part may be connected by means of the switch to give an intermediate heat.

The electric heating units are automatically controlled by means of temperature responsive control devices 20, 21 and 22 which are conveniently arranged in the compartments 11, 12 and 13 respectively. These control devices may be and are shown as consisting of a well known form of bimetallic thermostatic element. The thermostat 20 is arranged to engage a stationary contact 23 with its free end and close the circuit for an operating coil 24 upon the occurrence of a predetermined minimum temperature in the compartment 11. As shown, the stationary contact 23 is connected through a conductor 25 to a supply main 26ª forming with main 26ᵇ the two sides of a supply source 26, the thermostat 20 being connected through a conductor 27 to one terminal of the coil 24, the opposite terminal of which is connected through the conductor 28 to a supply main 26ᵇ. The thermostats 21 and 22 are similarly arranged to open and close circuits for operating coils 30 and 31 respectively.

The coils 24, 30 and 31 operate two-way relay switches of any suitable form in circuit with the heating units of the oven. As shown, the armatures 32, 33 and 34 operated by the coils each carry two insulated bridging switch contacts, whereby when a coil is energized it pulls up its armature and thereby moves each of its bridging contacts into engagement with a pair of stationary contacts thus closing a circuit from one stationary contact to the other and hence the circuit of the heating unit controlled thereby.

In the arrangement shown the thermostat 20 controls the circuit of heating unit 14, and also controls the circuit of heating unit 15 jointly with thermostat 21 which in turn controls the circuit of heating unit 16 jointly with thermostat 22. The thermostat 22 in turn controls heating unit 16 jointly with thermostat 21 and has sole control of heating unit 17. Upon the occurrence of a predetermined minimum temperature causing thermostat 20 to engage its stationary contact 23 and energize coil 24, the armature 32 will be pulled up by coil 24 and a circuit closed from supply main 26$^b$ through conductor 35, the lower pair of contacts associated with armature 32, and conductor 36 to the sections 14$^a$ and 14$^b$ of resistor 14 in parallel, the connections of the parts of each section, of course, being determined by the three-heat switches 18. The opposite terminals of the sections are connected through conductors 37 and 38 to the supply main 26$^a$. A circuit is also closed through conductor 35, the upper pair of contacts, and conductor 39 to the two sections 15$^a$ and 15$^b$ of heater 15 in parallel, the opposite terminals of these sections being connected to supply main 26$^a$ through conductors 40 and 41. When the circuit of coil 30 is closed by thermostat 21 a circuit is closed from supply main 26$^b$ through conductor 42, the lower pair of contacts to conductor 39 and thence to sections 15$^a$ and 15$^b$. At the same time a circuit is closed from conductor 42 through the upper pair of contacts and conductor 43 to the sections 16$^a$ and 16$^b$ of heating unit 16 in parallel, the opposite terminals of sections 16$^a$ and 16$^b$ being connected through conductors 45 and 46 to supply main 26$^a$. In a similar manner, when thermostat 22 closes the circuit of coil 31, a heating circuit is completed from supply main 26$^b$ through conductor 44, the lower pair of contacts to supply main 43 and thence to the sections 16$^a$ and 16$^b$ as previously described. At the same time a heating circuit is closed through conductor 44, the upper pair of contacts and through the conductor 47 to the two sections 17$^a$ and 17$^b$ of heating unit 17, the opposite terminals of the sections being connected to supply main 26$^a$ through conductors 48 and 49.

This automatic control can be modified by means of the three-heat switches 18 in series with the various sections. By means of these switches the ratio of heat generation at the top and bottom of the compartments can be varied to meet the requirements of the particular food being baked. Furthermore, the switches can be turned to give a high rate of heat generation when the oven is being brought up to baking temperature, and thereafter turned to medium or low heat for automatic control. In this way a more even temperature may be obtained than would be possible if the oven were operated at high heat when automatically controlled.

In the operation of the temperature regulator the thermostats 20, 21 and 22 may be adjusted so as to open and close their respective control circuits at substantially the same temperatures. The thermostats will therefore operate to automatically maintain an even predetermined average temperature in each compartment. As a result the temperature throughout the interior of the oven will be maintained substantially uniform. Thus it will be evident from the previous description that should the temperature in the compartment 11 decrease to a predetermined minimum, the thermostat 20 will cause the supply circuits to heaters 14 and 15 to be closed. Subsequently upon the occurrence of a predetermined maximum temperature in compratment 11 the thermostat 20 will open these circuits, although the circuit of heating unit 15 may be maintained closed by the thermostat 21 should the temperature in compartment 12 be below a predetermined minimum temperature in which case heating unit 16 will be energized under the control of thermostat 21. Thermostat 22 controls the heating units 17 and 16 in the same manner that heating units 14 and 15 are controlled by the thermostat 20.

In the modified form of my invention shown in Fig. 2, it will be observed that the thermostat 20 controls the heating unit 14 as in the form shown in Fig. 1, but controls only one section 15$^a$ of heating unit 15. The conductor 39 in this case leads directly to the section 15$^a$. Furthermore, the thermostat 21 controls only the sections 15$^b$ and 16$^a$ of the heating units 15 and 16, circuits being completed for these sections through the conductor 42, the lower and upper pairs of contacts and conductors 50 and 51 respectively. The thermostat 22 controls the entire heating unit 17 as before, but controls only section 16$^b$ of the unit 16, a circuit being closed though conductor 44, the lower pair of contacts and conductor 52 to the section 16$^b$.

It will be observed that in the arrangements shown in Figs. 1 and 2, the intermediate heating unit 15 is controlled jointly by the thermostats 20 and 21 in the compartments into which it radiates, while the intermediate heating unit 16 is controlled jointly by the thermostats 21 and 22 in the compartments into which it radiates. In the arrangement of Fig. 1, however, both sections of heating units 15 and 16 are controlled by thermostats 20 and 22 respectively jointly with thermostat 21, while in the arrangement of Fig. 2 one section of heating unit 15 is controlled solely by thermostat 20 and one section of heating unit 16 is controlled solely by thermostat 22, the remaining sections of these heating units being controlled solely by the thermostat 21.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States is:—

1. The method of regulating the temperature of a multiple compartment oven provided with heating units arranged to radiate heat into adjacent compartments, which consists in controlling said heating units in pairs in accordance with the respective temperatures in such compartments.

2. The method of regulating the temperature of a vertical multiple compartment electric oven provided with a heating unit in the top of each compartment and one in the bottom of the lower compartment, which consists in controlling the top and bottom heating units in accordance with the temperatures in the top and bottom compartments respectively, and the intermediate heating units in pairs in accordance with the respective temperatures in the compartments into which they radiate.

3. The combination with a multiple compartment oven provided with a plurality of heating units distributed throughout the compartments, some of said units radiating heat into two adjacent compartments, of temperature responsive control devices for said heating units in said compartments so arranged that said second named units are controlled jointly in accordance with the respective temperatures in such adjacent compartments.

4. The combination with an electric oven comprising a plurality of compartments arranged side by side and provided with heating units in said compartments, of temperature responsive control devices in said compartments, and electrical connections for said control devices whereby intermediate heating units are each controlled jointly by the temperature responsive devices in its own and an adjacent compartment.

5. The combination with an electric oven comprising a plurality of compartments and provided with a heating unit at each end and intermediate heating units radiating into adjacent compartments, of temperature responsive control devices in said compartments, and electrical connections for said control devices whereby the heating units at the ends of the oven are controlled by the control devices in the end compartments and the intermediate units jointly by the control devices in the compartments adjacent thereto.

6. The combination with an electric oven divided into a plurality of compartments arranged one above the other and provided with a heating unit in the top of each compartment and in the bottom of the lower compartment, of a temperature responsive control device in each compartment, and electrical connections for said control devices whereby the upper and lower heating units are controlled by the control devices in the upper and lower compartments respectively, and an intermediate heating unit controlled jointly by the control devices in its own and an adjacent compartment.

7. The combination with a multiple compartment electric oven provided with a plurality of heating units distributed throughout the compartments, some of said units radiating heat into two adjacent compartments, a plurality of switching devices for controlling the circuits of said heating units, said switching devices being connected and arranged so that said second named units are controlled jointly by a plurality of switches, and temperature responsive devices in said compartments for controlling said switching devices.

8. The combination with an electric oven comprising a plurality of compartments provided with a heating unit at each end and intermediate heating units radiating into adjacent compartments, of a plurality of independent switching devices for controlling the circuits of said heating units, said switching devices being connected and arranged so that the circuits of intermediate heating units are jointly controlled by a plurality of switching devices, and temperature responsive devices in said compartments for controlling said switching devices.

9. The combination with an electric oven comprising a plurality of compartments provided with a heating unit at each end and intermediate heating units radiating into adjacent compartments, of a switching device for controlling the circuit of each end heating unit and the circuit of an intermediate heating unit, switching devices for controlling the circuits of said intermediate heating units in pairs and the former switching devices in pairs, thermostats in the end compartments for controlling the end switching devices, and thermostats in the intermediate compartments for controlling the other switching devices.

10. The combination with a multiple compartment electric oven provided with a plurality of heating units distributed throughout the compartments, of a source of electrical supply for said heating units, temperature responsive control devices in said compartments for connecting and disconnecting said heating units with relation to said supply source so as to maintain a predetermined temperature, and manually operated means associated with each of said heating units for varying the rate at which heat is generated by said heating units when connected to said supply source by said temperature responsive control devices.

11. The combination with a multiple compartment electric oven provided with a plurality of heating units distributed throughout the compartments, each of said units being divided into a plurality of sections, of a source of electrical supply for said heating units, temperature responsive control devices in said compartments for connecting and disconnecting said heating units with relation to said supply source so as to maintain a predetermined temperature, and manually operated switching means associated with each of said heating units for varying the number of sections included by each heating unit.

12. The combination with a multiple compartment oven in which the compartments are arranged one above the other, of an electric heating unit in the top of each compartment and a heating unit in the bottom of the lower compartment, a thermostat in each compartment, connections whereby the heating unit in each intermediate compartment is controlled by the joint action of the thermostat in its own compartment and the compartment directly above, and connections whereby the heating unit in the top compartment and the bottom heating unit in the lowermost compartment are controlled solely by the independent action of the thermostats in their respective compartments.

In witness whereof, I have hereunto set my hand this 25th day of June, 1924.

JACOB L. SHROYER.